(12) United States Patent
Lubowitz et al.

(10) Patent No.: US 7,825,211 B2
(45) Date of Patent: Nov. 2, 2010

(54) SINGLE-STEP-PROCESSABLE POLYIMIDES

(75) Inventors: Hyman Ralph Lubowitz, Rolling Hills Estates, CA (US); Thomas Karl Tsotsis, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/767,077

(22) Filed: Jun. 22, 2007

(65) Prior Publication Data

US 2008/0319159 A1 Dec. 25, 2008

(51) Int. Cl.
C08G 12/02 (2006.01)

(52) U.S. Cl. .................. 528/353; 528/170; 528/183; 528/188; 528/310; 528/335; 564/306; 564/431; 564/432; 564/433; 564/434; 558/424; 525/432

(58) Field of Classification Search .................. 528/170, 528/271, 272, 183, 188, 310, 332, 335, 353; 564/306, 307, 308, 309, 430, 431, 432, 433, 564/434; 558/424; 525/432

See application file for complete search history.

(56) References Cited

U.S. PATENT DOCUMENTS

| | | | |
|---|---|---|---|
| 3,565,549 A | 2/1971 | Lubowitz et al. | |
| 3,745,149 A | 7/1973 | Serafini et al. | |
| 4,255,471 A | 3/1981 | Boldebuck et al. | |
| 4,414,269 A | 11/1983 | Lubowitz et al. | |
| 4,476,184 A | 10/1984 | Lubowitz et al. | |
| 4,536,559 A | 8/1985 | Lubowitz et al. | |
| 4,547,553 A | 10/1985 | Lubowitz et al. | |
| 4,584,364 A | 4/1986 | Lubowitz et al. | |
| 4,661,604 A | 4/1987 | Lubowitz et al. | |
| 4,684,714 A | 8/1987 | Lubowitz et al. | |
| 4,739,030 A | 4/1988 | Lubowitz et al. | |
| 4,847,333 A | 7/1989 | Lubowitz et al. | |
| 4,851,495 A | 7/1989 | Sheppard et al. | |
| 4,851,501 A | 7/1989 | Lubowitz et al. | |
| 4,868,270 A | 9/1989 | Lubowitz et al. | |
| 4,871,475 A | 10/1989 | Lubowitz et al. | |
| 4,876,328 A | 10/1989 | Lubowitz et al. | |
| 4,935,523 A * | 6/1990 | Lubowitz et al. | 548/431 |
| 4,958,031 A | 9/1990 | Sheppard et al. | |
| 4,965,336 A | 10/1990 | Lubowitz et al. | |
| 4,980,481 A | 12/1990 | Lubowitz et al. | |
| 4,981,922 A | 1/1991 | Sheppard et al. | |
| 4,985,568 A | 1/1991 | Lubowitz et al. | |
| 4,990,624 A | 2/1991 | Sheppard et al. | |
| 5,011,905 A | 4/1991 | Lubowitz et al. | |
| 5,066,541 A | 11/1991 | Lubowitz et al. | |
| 5,071,941 A | 12/1991 | Lubowitz et al. | |
| 5,081,198 A | 1/1992 | Pater | |
| 5,082,905 A | 1/1992 | Lubowitz et al. | |
| 5,087,701 A | 2/1992 | Lubowitz et al. | |
| 5,104,967 A | 4/1992 | Sheppard et al. | |
| 5,109,105 A | 4/1992 | Lubowitz et al. | |
| 5,112,939 A | 5/1992 | Lubowitz et al. | |
| 5,115,087 A | 5/1992 | Sheppard et al. | |
| 5,116,935 A | 5/1992 | Lubowitz et al. | |
| 5,120,819 A | 6/1992 | Lubowitz et al. | |
| 5,126,410 A | 6/1992 | Lubowitz et al. | |
| 5,144,000 A | 9/1992 | Sheppard et al. | |
| 5,151,487 A | 9/1992 | Lubowitz et al. | |
| 5,155,206 A | 10/1992 | Lubowitz et al. | |
| 5,159,055 A | 10/1992 | Sheppard et al. | |
| 5,171,822 A | 12/1992 | Pater | |
| 5,175,233 A | 12/1992 | Lubowitz et al. | |
| 5,175,234 A | 12/1992 | Lubowitz et al. | |
| 5,175,304 A | 12/1992 | Sheppard et al. | |
| 5,198,526 A | 3/1993 | Lubowitz et al. | |
| 5,210,213 A | 5/1993 | Sheppard et al. | |
| 5,216,117 A | 6/1993 | Sheppard et al. | |
| 5,227,461 A | 7/1993 | Lubowitz et al. | |
| 5,239,046 A | 8/1993 | Lubowitz et al. | |
| 5,268,519 A | 12/1993 | Sheppard et al. | |
| 5,286,811 A | 2/1994 | Lubowitz et al. | |
| 5,338,827 A | 8/1994 | Serafini et al. | |
| 5,344,894 A | 9/1994 | Lubowitz et al. | |

(Continued)

FOREIGN PATENT DOCUMENTS

EP 0 626 412 A 11/1994

(Continued)

OTHER PUBLICATIONS

Southcott Mark, et al., "The development of processable, fully imidized, polyimides for high-temperature applications", *High Perform. Polym.*, 6 (1994) pp. 1-12.

(Continued)

*Primary Examiner*—Ling-Siu Choi
*Assistant Examiner*—Frances Tischler
(74) *Attorney, Agent, or Firm*—Alston & Bird LLP

(57) ABSTRACT

A process for synthesizing formulations for polyimides suitable for use in high-temperature composites in which all reactions other than chain-extension have already taken place prior to making a composite is described, wherein the resulting oligomers comprise a backbone and at least one difunctional endcap. The resulting resin systems have only the single step of endcap-to-endcap reactions during composite processing. Prior to the initiation temperature of these endcap-to-endcap reactions, the resins are stable affording the composite manufacturer a very large processing window.

12 Claims, No Drawings

U.S. PATENT DOCUMENTS

| | | | |
|---|---|---|---|
| 5,367,083 A | 11/1994 | Sheppard et al. | |
| RE34,820 E | 1/1995 | Lubowitz et al. | |
| 5,403,666 A | 4/1995 | Lubowitz et al. | |
| 5,412,065 A | 5/1995 | Amone et al. | |
| 5,412,066 A | 5/1995 | Hergenrother et al. | |
| 5,446,120 A | 8/1995 | Lubowitz et al. | |
| 5,455,115 A | 10/1995 | Lubowitz et al. | |
| 5,463,076 A | 10/1995 | Sheppard et al. | |
| 5,478,915 A * | 12/1995 | Amone et al. | 528/353 |
| 5,506,060 A | 4/1996 | Lubowitz et al. | |
| 5,512,676 A | 4/1996 | Sheppard et al. | |
| 5,516,876 A | 5/1996 | Lubowitz et al. | |
| 5,521,014 A | 5/1996 | Lubowitz et al. | |
| 5,530,089 A | 6/1996 | Sheppard et al. | |
| 5,550,204 A | 8/1996 | Lubowitz et al. | |
| 5,554,769 A | 9/1996 | Sheppard et al. | |
| 5,573,854 A | 11/1996 | Sheppard et al. | |
| 5,602,226 A | 2/1997 | Lubowitz et al. | |
| 5,618,907 A | 4/1997 | Lubowitz et al. | |
| 5,645,925 A | 7/1997 | Sheppard et al. | |
| 5,654,396 A | 8/1997 | Lubowitz et al. | |
| 5,693,741 A | 12/1997 | Sheppard et al. | |
| 5,705,574 A | 1/1998 | Lubowitz et al. | |
| 5,705,598 A | 1/1998 | Lubowitz et al. | |
| 5,739,256 A | 4/1998 | Lubowitz et al. | |
| 5,756,645 A | 5/1998 | Lubowitz et al. | |
| 5,780,583 A | 7/1998 | Lubowitz et al. | |
| 5,817,738 A | 10/1998 | Lubowitz et al. | |
| 5,817,744 A | 10/1998 | Sheppard et al. | |
| 5,968,640 A | 10/1999 | Lubowitz et al. | |
| 5,969,079 A | 10/1999 | Lubowitz et al. | |
| 6,124,035 A | 9/2000 | Connell et al. | |
| 6,569,954 B1 | 5/2003 | Sheppard et al. | |
| 6,958,192 B2 | 10/2005 | Hergenrother et al. | |
| 7,041,778 B1 | 5/2006 | Curliss et al. | |
| 2005/0080229 A1 * | 4/2005 | Deets et al. | 528/310 |

FOREIGN PATENT DOCUMENTS

| | | |
|---|---|---|
| EP | 0 887 364 A | 12/1998 |
| WO | WO 03/087194 A | 10/2003 |

OTHER PUBLICATIONS

International Search Report and Written Opinion for PCT/US2008/064057, dated Sep. 3, 2008.

International Search Report and Written Opinion for PCT/US2008/064061, dated Sep. 3, 2008.

International Search Report and Written Opinion for PCT/US2008/064063, dated Sep. 3, 2008.

* cited by examiner

SINGLE-STEP-PROCESSABLE POLYIMIDES

BACKGROUND OF THE INVENTION

Embodiments of the present invention relate to single-step processes for synthesizing polyimide oligomers having high thermal and oxidative stability and improved mechanical properties.

It is well known in the art that polyimides exhibit properties desirable for high-temperature applications such as those demanded in the aerospace industry. Existing materials are primarily based on Polymerization of Monomeric Reactants (PMR) chemistry and are, with a few exceptions, only suitable for prepreg. Additionally, these materials are plagued with various deficiencies. For example, PMR-15, which is described in U.S. Pat. No. 3,745,149, contains a known carcinogen 4,4-methylene dianiline (MDA), is prone to microcracking, difficult to handle during processing and has a short shelf life. Many PMR materials cannot be used for thick composites due to unwanted reaction byproducts.

Historically, the utilization of polyimides in high-temperature composite applications has been limited due to their processing cost and difficulties. Problems associated with processing polyimides for such applications include poor solubility in many solvents, evolution of volatiles during imidization and the high-temperatures necessary for processing.

A fundamental problem withal of the PMR-based chemistries (and many others as well) is that multiple reactions take place during the curing and crosslinking of these resins. Having multiple reactions taking place means that reactions other than those principally desired may take place. Furthermore, reactions at temperatures below the desired processing and cure temperatures can increase resin viscosity unacceptably. Accordingly, it is desirable to have resin systems for polymers that only have one reaction mechanism during curing. Moreover, it is highly desirable to have the single reaction mechanism occur between endcaps that have difunctionality.

BRIEF SUMMARY OF THE INVENTION

Embodiments of the present invention satisfy the aforementioned needs by providing a process for synthesizing formulations for polyimides suitable for use in high-temperature composites in which all reactions other than chain-extension have already taken place prior to making a composite. The resulting resin systems have only the single step of endcap-to-endcap reactions during composite processing. Thus, prior to the initiation temperature of these endcap-to-endcap reactions, the resins are stable affording the composite manufacturer a very large processing window, which is clearly highly advantageous to anyone skilled in the art.

One process for producing suitable polyimides comprises the pre-imidization of at least one endcap monomer with a chemical backbone/precursor suitable for composite manufacturing prior to making a composite; wherein the resulting resin system is subsequently heated to initiate the single step of endcap-to-endcap reactions upon making a composite. The use of precursors with moderate-to-lower molecular weights allows easier melt-processability and increased crosslink density. Accordingly, formulations can be specifically prepared, without sacrificing crosslink density, to address diverse applications requiring stability at various temperatures, application-specific mechanical properties, as well as different chemical resistances. Therefore, polymeric resins manufactured according to various embodiments of the present invention are ideal for high-performance composites as presently needed by the aerospace industry.

DETAILED DESCRIPTION OF THE INVENTION

The present invention will now be described more fully hereinafter, in which some, but not all embodiments of the inventions are shown. Indeed, the invention may be embodied in many different forms and should not be construed as limited to the embodiments set forth herein; rather, these embodiments are provided so that this disclosure will satisfy applicable legal requirements.

Unlike PMR-based chemistries wherein, after being coated on a reinforcing material, all monomeric reactants are reacted simultaneously, volatiles are removed, and resin is cured to form a polyimide prepreg or composite, embodiments of the present invention comprise the sequential reaction of monomers such that the monomers are pre-imidized prior to the making of a composite. Accordingly, the pre-imidized resin system exhibits only one reaction mechanism, namely the single step of endcap-to-endcap reactions, during the curing and crosslinking of the resin to form a composite. Below temperatures for initiating the endcap-to-endcap reactions, the polyimide compositions are easily processable, unreactive and otherwise latent.

In one of its aspects, the present invention is directed to a process for synthesizing polyimide oligomers suitable for high-temperature polymeric composites, wherein all reactions except for chain-extension reactions have been performed prior to composite fabrication. In accordance with certain embodiments of the present invention, monomeric reactants are imidized prior to composite manufacturing and subsequently the remaining single step of endcap-to-endcap reactions is initiated during composite manufacturing for the following:

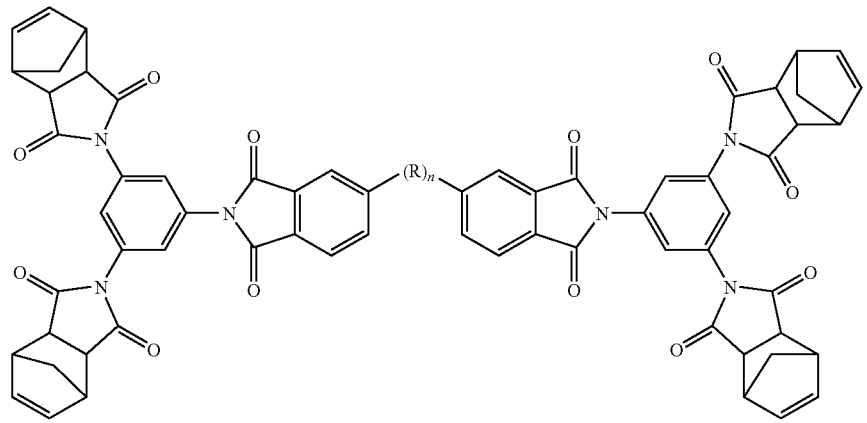

wherein R is selected from the group consisting of

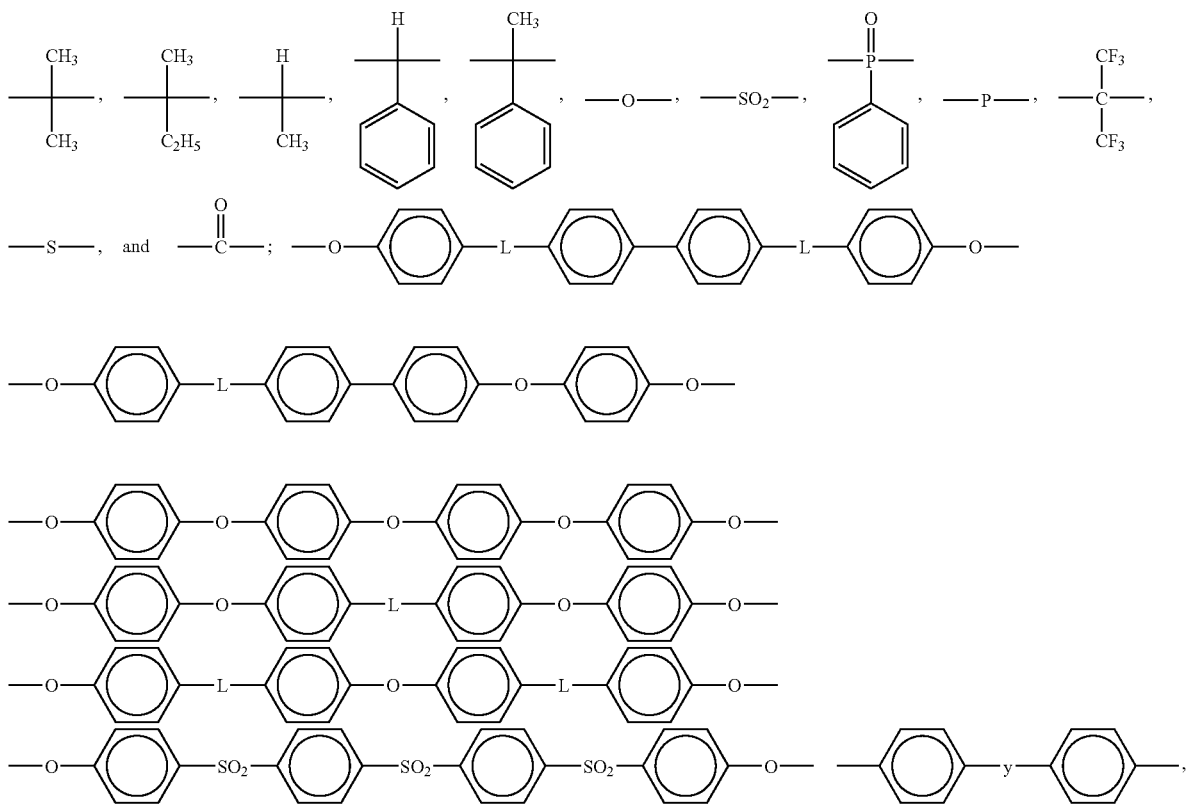

wherein L is —CH$_2$—, —(CH$_3$)$_2$C—, —(CH$_3$)$_2$C—, —O—, —S—, —SO$_2$— or —CO—;

wherein y is —SO$_2$—, —S—, —(CF$_3$)$_2$C—, —O—, or —(CH$_3$)$_2$C—;

and in certain embodiments n is selected such that the molecular weight ranges from about 1000 to about 5000.

In yet another embodiment, monomeric reactants are imidized prior to composite manufacturing and subsequently the single remaining step of endcap-to-endcap reactions is initiated during composite manufacturing for the following:

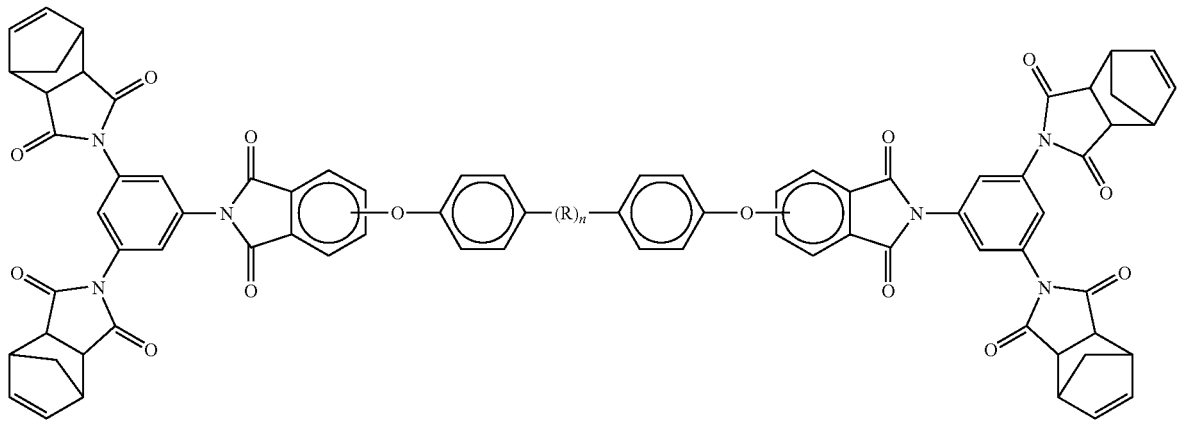

wherein R is selected from the group consisting of

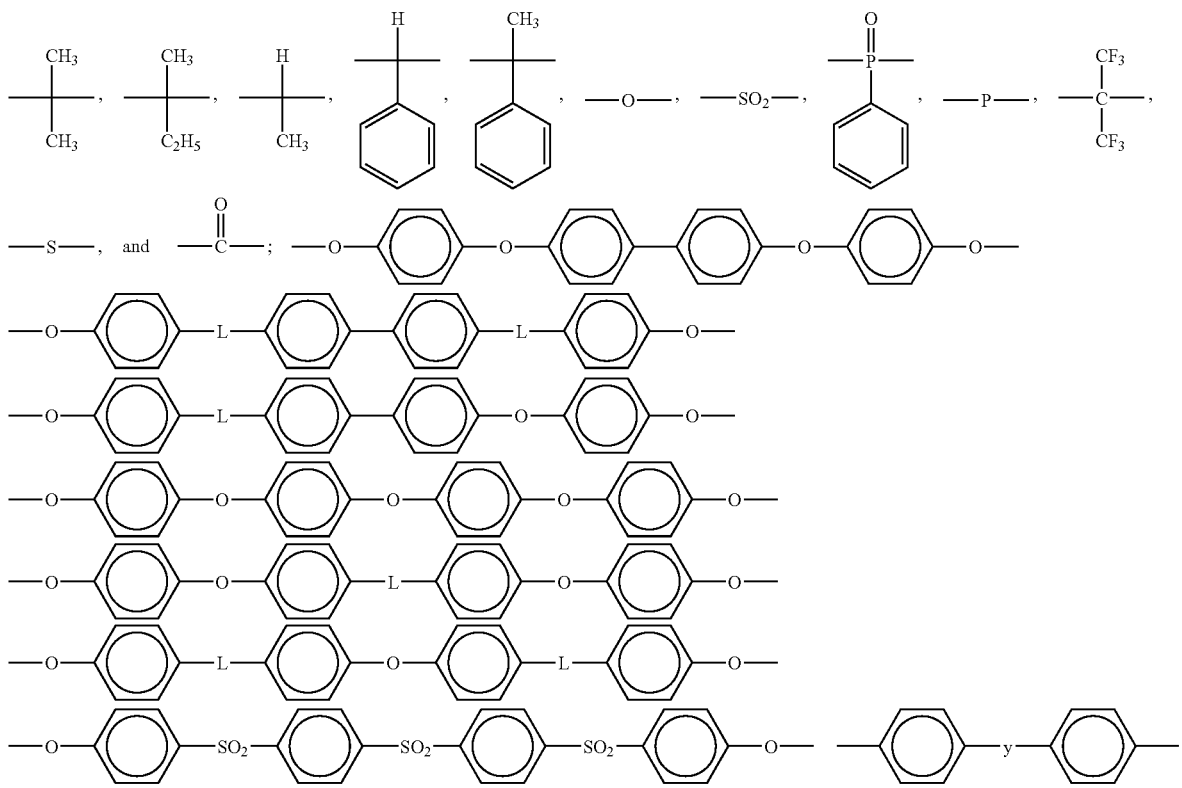

wherein L is —CH$_2$—, —(CH$_3$)$_2$C—, —(CH$_3$)$_2$C—, —O—, —S—, —SO$_2$— or —CO—;

wherein y is —SO$_2$—, —S—, —(CF$_3$)$_2$C—, —O—, or —(CH$_3$)$_2$C—;

and in certain embodiments n is selected such that the molecular weight ranges from about 1000 to about 5000.

In various alternative embodiments, the following monomers are reacted prior to composite manufacturing:

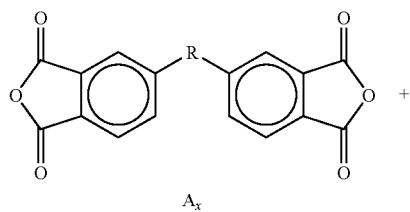

$A_x$

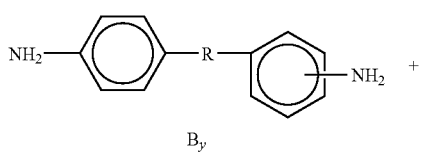

$B_y$

-continued

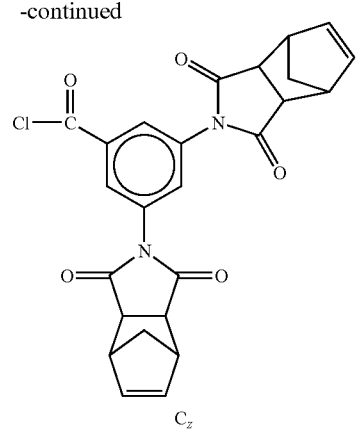

$C_z$

The resulting resin system is subsequently cured upon manufacturing of the composite by heating the resin system to initiate the remaining single step of endcap-to-endcap reactions. In various embodiments x, y and z are each selected such that the molecular weight of the resulting pre-imidized material ranges from about 1000 to about 5000. In various embodiments, R is selected from the group previously described.

As previously stated, embodiments of the present invention comprise a process for synthesizing polyimide oligomers comprises the sequential reaction of monomers such that the monomers are pre-imidized prior to the making of a composite resulting in a pre-imidized resin system exhibiting only one reaction mechanism, namely endcap-to-endcap reactions, during the curing and crosslinking of the resin to form a composite. A list of exemplary monomers suitable as chemical backbones include, but are not limited to: a dialkyl ester of an aromatic tetracarboxylic acid; 4,4 methylene dianiline (MDA); a dialkyl, trialkyl or tetraalkylester of biphenyltetracarboxylic acid; phenylenediamine; 3,4'-oxydianiline (3,4'-ODA); a dimethyl ester of 3,3',4,4'-benzophenonetetracarboxylic acid (BTDE); 3,3',4,4'-benzophenonetetracarboxylic dianhydride (BTDA), 3,4,3',4'-biphenyltetracarboxylic dianhydride (BPDA), 2,2 bis(3',4'-dicarboxy phenyl)hexafluoro propane dianhydride (6FDA), 2-(3,4-dicarboxyphenyl)-1-phenylacetylene anhydride (4-PEPA); 2,3,3',4'-biphenyltetracarboxylic dianhydride and 2,2-bis(4-[4-aminopnenoxyl]phenyl)propane (BAPP).

In various embodiments, the chemical backbones/precursors that are reacted with at least one endcap comprise a moderate molecular weight between about 1000 and about 5000. In another embodiment the chemical backbone comprises a molecular weight of about 2500 to about 5000. In yet another embodiment, the chemical backbones comprises a lower-molecular weight between about 1000 to about 3000. Other embodiments may comprise a chemical backbone from about 1000 to about 2000, from about 2000 to about 3000 or alternatively from about 1500 to about 2500. In one alternative embodiment the chemical backbone comprises a molecular weight that does not exceed about 3000. By using precursors with lower-molecular weights, easier melt-processability is achieved.

Although numerous endcap monomers are contemplated, various embodiments of the present invention comprise difunctional endcaps. In certain preferred embodiments, the endcaps comprise a dinadic material such as a dinadic acid chloride, a dinadic phenol or a dinadic amine.

Endcaps suitable for specific embodiments of the present invention include but are not limited to, for example, the following compounds:

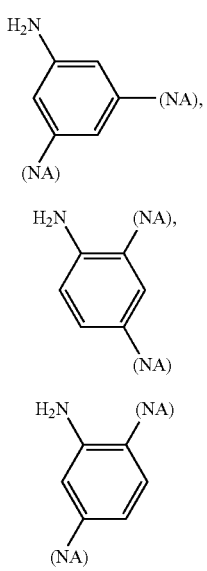

wherein (NA) is nadic anahdride illustrated by the formula:

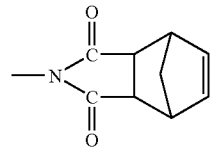

In one alternative embodiment, suitable endcaps include difunctional imidophenols, which are condensation products of diamino-phenols and anhydrides, as follows:

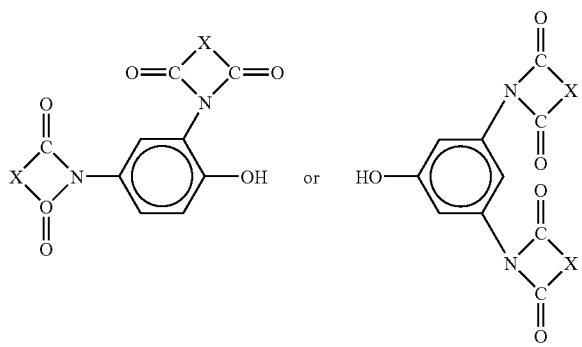

wherein, X is selected from the group consisting of:

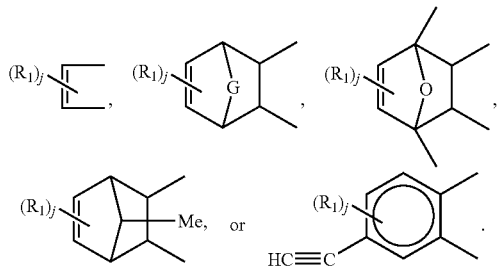

$R_1$ is a lower alkyl, lower alkoxy, aryl, substituted aryl, or mixtures thereof; G is —$SO_2$—, —S—, —O—, or —$CH_2$—; and j is 0, 1, or 2.

Another aspect of the present invention pertains to producing high-temperature composites. Resin systems produced in accordance with embodiments of the present invention exhibit densities less than those of metal counterparts. Accordingly, composites comprising polyimide resins formed by a single-step process are ideal for replacing metallic structures to reduce weight. Where high-temperature strength also drives the design, a material with higher allowable strength at elevated temperatures, such as composite embodiments of the present invention, will reduce overall structural weight. Implementation of the cost effective process for synthesizing polyimide oligomers enables a simplified and broader application of polyimide resins into polymer formulations for the production of lighter-weight composite structures to be used in place of metallic structures on aerospace vehicles. Thus, reducing the overall weight of aerospace vehicles or the like. Also, polymeric composites manufactured in accordance with embodiments of the present invention can be used to replace other high-temperature composites that require a thermal-protection layer. Similarly, this too, will reduce the weight of aerospace vehicles by obviating the need for the thermal protection. Although advantageous for use with aerospace vehicles, other applications, such as other weight sensitive applications, may also employ polymeric composites according to embodiments of the present invention Composites and prepregs comprising polyimide oligomer compositions formulated according to embodiments of the present invention can by prepared by any conventional technique known in the art. For example, in certain embodiments the polyimide oligomers exhibit a melt viscosity such that a composite can be prepared by known liquid-molding techniques such as resin-transfer molding and resin film infusion among others. Depending on the application, the reinforcement materials can include, for example, woven fabrics, continuous or discontinuous fibers (in chopped or whisker form), ceramics, organics, carbon (graphite), or glass.

For example, a composite can be manufactured by impregnating reinforcing materials with a pre-imidized composition according to embodiments of the present invention and cured anaerobically and under sufficient pressure to prevent the creation of voids. If the polyimide oligomers are nadic endcapped, the curing process will initially release cyclopentadiene. In such cases, the applied pressure during the curing process should be sufficient to re-dissolve the cyclopentadiene, which will react with the resin itself and become incorporated into the backbone. Suitable pressures for composite fabrication range from atmospheric to 1,000 psi. depending upon the nature of the polyimide composition. Depending on the specific polyimide composition to be cured, the pre-imidized resin systems may be cured at temperatures known in the art. For example, the pre-imidized resin systems by be cured by subjecting them to temperatures ranging from about 200° C. to about 350° C.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for forming a polymeric composite comprising:
   (i) reacting an aromatic dianhydride directly with at least one dinadic phenyl amine endcap to form polyimide oligomers, wherein the oligomers may then only react through endcap-to-endcap reactions and are otherwise latent and unreactive below the temperature at with these reactions occur;
   (ii) impregnating reinforcing materials with an effective amount of the polyimide oligomers;
   (iii) curing the polyimide oligomers by subjecting the polyimide oligomer impregnated materials to temperatures ranging from about 200° C. to about 350° C. at pressures ranging from about atmospheric to about 1000 p.s.i.

2. A method of forming a polymeric composite according to claim 1, wherein the reinforcing materials comprise glass fibers.

3. A method of forming a polymeric composite according to claim 1, wherein the aromatic dianhydride is a compound selected from the group consisting of 3,3',4,4'-benzophenonetetracarboxylic dianhydride, 3,4,3',4'-biphenyltetracarboxylic dianhydride, 2,2 bis (3',4'-dicarboxy phenyl) hexafluoro propane dianhydride, 2,3,3',4'-biphenyltetracarboxylic dianhydride, and 2,3,3',4'-biphenyltetracarboxylic dianhydride.

4. A method of forming a polymeric composite according to claim 1, wherein the aromatic dianhydride comprises:

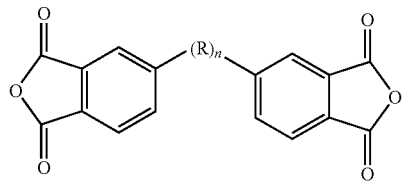

wherein R is selected from the group consisting of

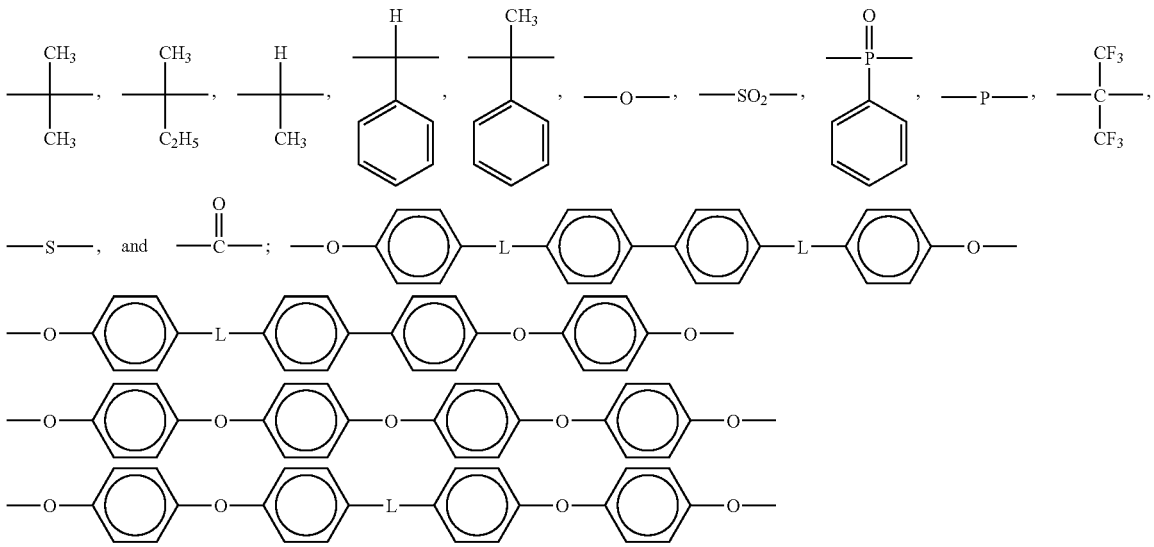

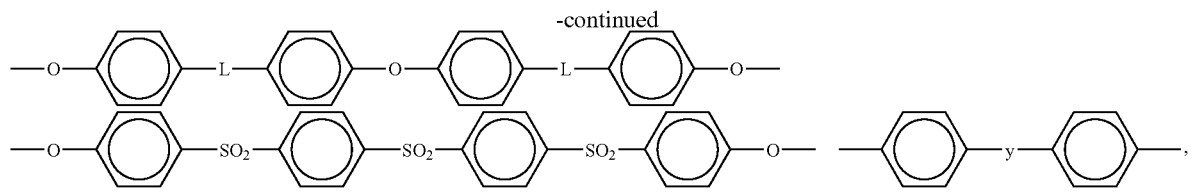

wherein L is —CH₂—, —(CH₃)₂C—, —(CH₃)₂C—, —O—, —S—, —SO₂— or —CO—;
wherein y is —SO₂—, —S—, —(CF₃)₂C—, —O—, or —(CH₃)₂C—;
and n is selected such that the molecular weight does not exceed about 3000.

5. A method of forming a polymeric composite according to claim 1, wherein the dinadic phenyl amine comprises:

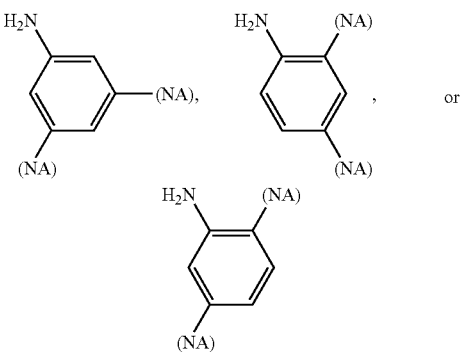

wherein (NA) is nadic anhydride illustrated by the formula:

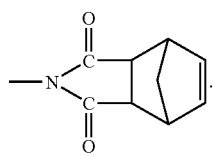

6. A method of forming a polymeric composite according to claim 5, wherein the polyimide oligomer impregnated materials are subjected to a pressure during the curing process that is sufficient to re-dissolve any cyclopentadiene that releases during the curing process.

7. A method for forming a polymeric composite comprising:
(i) forming a polyimide oligomer by directly reacting an aromatic dianhydride with at least one amine functional endcap to form the polyimide oligomer, wherein the resulting polyimide oligomers may then only react through endcap-to-endcap reactions and are otherwise latent and unreactive below the temperature at with these reactions occur;
(ii) impregnating reinforcing materials with an effective amount of the resulting polyimide oligomers;
(iii) curing the polyimide oligomers by subjecting the polyimide oligomer impregnated materials to temperatures ranging from about 200° C. to about 350° C. at pressures ranging from about atmospheric to about 1000 p.s.i.

8. A method of forming a polymeric composite according to claim 7, wherein the reinforcing materials comprise glass fibers.

9. A method of forming a polymeric composite according to claim 7, wherein the aromatic dianhydride is a compound selected from the group consisting of 3,3',4,4'-benzophenonetetracarboxylic dianhydride, 3,4,3',4'-biphenyltetracarboxylic dianhydride, 2,2 bis (3',4'-dicarboxy phenyl) hexafluoro propane dianhydride, 2,3,3',4'-biphenyltetracarboxylic dianhydride, and 2,3,3',4'-biphenyltetracarboxylic dianhydride.

10. A method of forming a polymeric composite according to claim 7, wherein the aromatic dianhydride comprises:

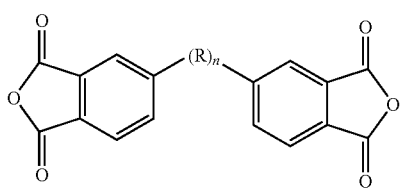

wherein R is selected from the group consisting of

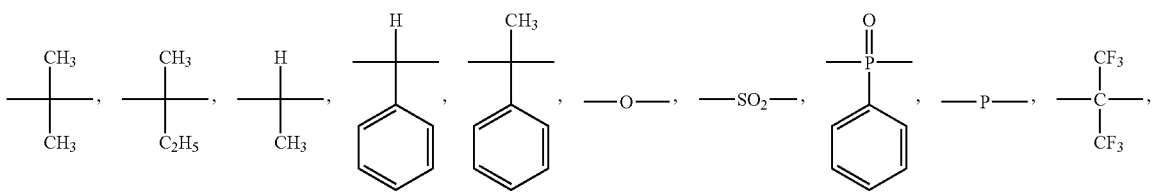

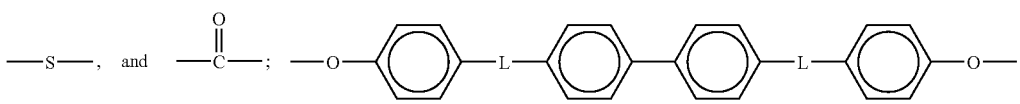

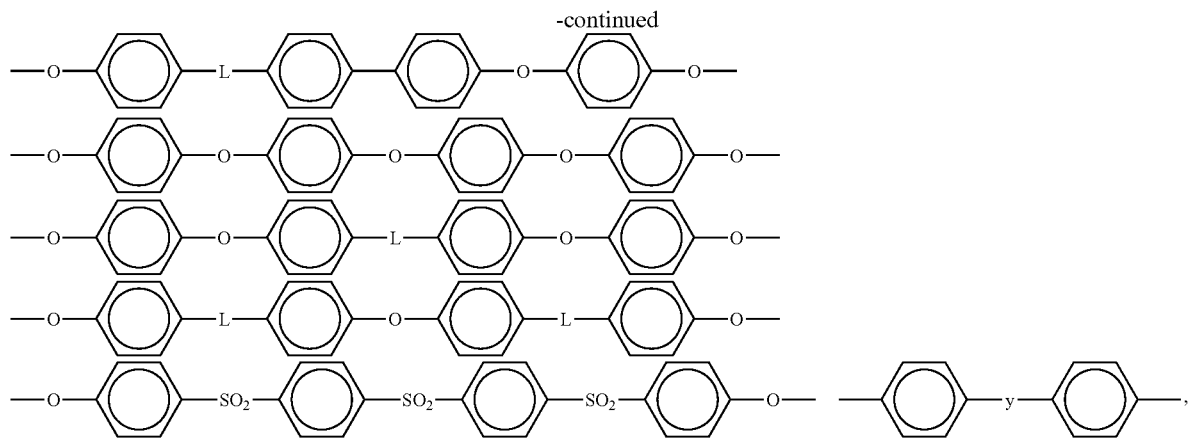

wherein L is —CH$_2$—, —(CH$_3$)$_2$C—, —(CH$_3$)$_2$C—, —O—, —S—, —SO$_2$— or —CO—;
wherein y is —SO$_2$—, —S—, —(CF$_3$)$_2$C—, —O—, or —(CH$_3$)$_2$C—;
and n is selected such that the molecular weight does not exceed about 3000.

11. A method of forming a polymeric composite according to claim 7, wherein the endcap comprises:

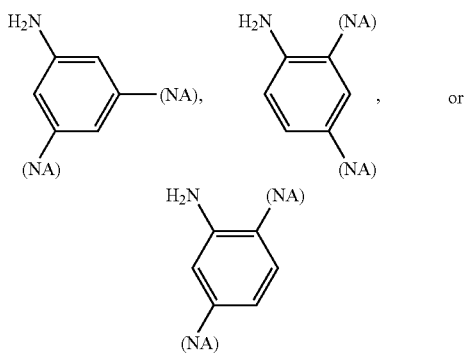

wherein (NA) is nadic anhydride illustrated by the formula:

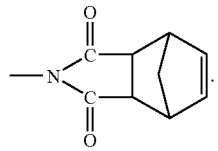

12. A method of forming a polymeric composite according to claim 11, wherein the polyimide oligomer impregnated materials are subjected to a pressure during the curing process that is sufficient to re-dissolve any cyclopentadiene that releases during the curing process.

\* \* \* \* \*